(12) United States Patent
Arbesman (10) Patent No.: US 10,569,494 B2
(45) Date of Patent: Feb. 25, 2020

(54) MULTILAYER METAL COMPOSITE AND BRAKE PAD INCLUDING SAME

(71) Applicant: NUCAP INDUSTRIES INC., Scarborough (CA)

(72) Inventor: Ray Arbesman, Toronto (CA)

(73) Assignee: Nucap Industries Inc., Scarborough (CA)

( * ) Notice: Subject to any disclaimer, the term of this patent is extended or adjusted under 35 U.S.C. 154(b) by 0 days.

(21) Appl. No.: 16/085,122

(22) PCT Filed: Apr. 11, 2017

(86) PCT No.: PCT/CA2017/050443
§ 371 (c)(1),
(2) Date: Sep. 14, 2018

(87) PCT Pub. No.: WO2017/177322
PCT Pub. Date: Oct. 19, 2017

(65) Prior Publication Data
US 2019/0077110 A1    Mar. 14, 2019

Related U.S. Application Data

(60) Provisional application No. 62/322,382, filed on Apr. 14, 2016.

(51) Int. Cl.
*F16D 69/04* (2006.01)
*B32B 3/06* (2006.01)
(Continued)

(52) U.S. Cl.
CPC ............. *B32B 3/06* (2013.01); *B32B 3/04* (2013.01); *B32B 3/10* (2013.01); *B32B 3/30* (2013.01); *B32B 5/16* (2013.01); *B32B 7/02* (2013.01); *B32B 7/08* (2013.01); *B32B 7/12* (2013.01); *B32B 15/00* (2013.01); *B32B 15/043* (2013.01); *B32B 15/06* (2013.01); *B32B 15/08* (2013.01); *B32B 15/14* (2013.01); *B32B 15/16* (2013.01); *B32B 15/18* (2013.01); *B32B 15/20* (2013.01); *B32B 25/047* (2013.01); *B32B 25/08* (2013.01); *B32B 25/10* (2013.01); *B32B 27/42* (2013.01);
(Continued)

(58) Field of Classification Search
CPC .. F16D 69/04; F16D 69/0408; F16D 69/0416; F16D 2069/0425; F16D 2069/0441; F16D 2069/0491
USPC .......................... 188/234, 242, 250 F, 250 G
See application file for complete search history.

(56) References Cited

U.S. PATENT DOCUMENTS 1,336,752 A * 4/1920 Muller .................. B25B 1/2452
188/234
2,451,326 A * 10/1948 Eksergian ............... F16D 65/02
188/234
(Continued)

FOREIGN PATENT DOCUMENTS

DE          202013010700 U1 * 1/2014  ........... F16D 65/092

*Primary Examiner* — Thomas J Williams
(74) *Attorney, Agent, or Firm* — Aird & McBurney LP (57) ABSTRACT

A multilayer metal composite includes a metal base layer having a base layer surface textured with a plurality of integral base layer barbs, and a metal substrate layer having a substrate layer surface textured with a plurality of integral substrate layer barbs. The substrate layer is impaled on the base layer barbs to secure the substrate layer to the base layer.

20 Claims, 5 Drawing Sheets

(51) Int. Cl.
  *B32B 3/30* (2006.01)
  *B32B 7/08* (2019.01)
  *F16D 69/02* (2006.01)
  *B32B 15/00* (2006.01)
  *B32B 25/04* (2006.01)
  *B32B 15/06* (2006.01)
  *B32B 27/42* (2006.01)
  *B32B 25/10* (2006.01)
  *B32B 7/12* (2006.01)
  *B32B 7/02* (2019.01)
  *B32B 15/20* (2006.01)
  *B32B 15/18* (2006.01)
  *B32B 15/08* (2006.01)
  *B32B 5/16* (2006.01)
  *B32B 25/08* (2006.01)
  *B32B 15/04* (2006.01)
  *B32B 15/14* (2006.01)
  *B32B 3/04* (2006.01)
  *B32B 15/16* (2006.01)
  *B32B 3/10* (2006.01)

(52) U.S. Cl.
  CPC ....... *F16D 69/027* (2013.01); *F16D 69/0408* (2013.01); *B32B 2250/44* (2013.01); *B32B 2260/021* (2013.01); *B32B 2260/025* (2013.01); *B32B 2260/046* (2013.01); *B32B 2262/0269* (2013.01); *B32B 2262/10* (2013.01); *B32B 2262/101* (2013.01); *B32B 2262/103* (2013.01); *B32B 2264/0214* (2013.01); *B32B 2264/06* (2013.01); *B32B 2264/10* (2013.01); *B32B 2264/102* (2013.01); *B32B 2264/108* (2013.01); *B32B 2307/536* (2013.01); *B32B 2307/732* (2013.01); *B32B 2307/744* (2013.01); *B32B 2457/00* (2013.01); *F16D 2069/0441* (2013.01)

(56) References Cited

U.S. PATENT DOCUMENTS

| | | | | |
|---|---|---|---|---|
| 2,904,138 | A | * | 9/1959 | Wilson ............... B61H 5/00 188/251 R |
| 5,123,514 | A | * | 6/1992 | Gatins, Jr. ........... F16D 65/092 192/107 M |
| 5,355,986 | A | * | 10/1994 | Biswas ............ F16D 69/0408 188/258 |
| 6,367,600 | B1 | * | 4/2002 | Arbesman ............ B21D 28/10 188/250 B |
| 2008/0156601 | A1 | * | 7/2008 | Himmelsbach ..... F16D 65/0006 188/250 B |
| 2015/0053517 | A1 | | 2/2015 | Arbesman et al. |

* cited by examiner

MULTILAYER METAL COMPOSITE AND BRAKE PAD INCLUDING SAME

CROSS-REFERENCES TO RELATED APPLICATIONS

This application claims the benefit of U.S. Provisional Patent Application No. 62/322,382, filed Apr. 14, 2016, the entirety of which is incorporated herein by reference.

FIELD

The disclosure relates to multilayer metal composites and methods of manufacturing multilayer metal composites. More specifically, the disclosure relates to brake pads including multilayer metal composites and methods of manufacturing same.

BACKGROUND

U.S. Patent Application Publication No. 2015/0204400 (Arbesman et al.) discloses a laminate sheet having two laminae. The first lamina is a relatively hard material having first and second surfaces. The first surface has a plurality of raised and generally pointed piercing structures, each structure having a tip. The second lamina is graphite foil material, which is mated to the relatively hard material, such that at least some of the piercing structures pierce the graphite foil material. In one embodiment, the first lamina has no perforations and is uniformly smooth. In another embodiment, the second surface also has a plurality of piercing structures and a third lamina comprising graphite foil is mated to the second surface.

U.S. Pat. No. 5,842,546 (Biswas) discloses a brake pad assembly having a split backplate design comprising a damping layer disposed between two metal plates which are mechanically fastened together such that the plates are slightly slidable relative to each other to allow independent vibration of the two plates. The two metal plates are provided with a ratio of the thickness of the plate farther from the friction material to the plate closer to the friction material of at least 1.50. The damping layer is formed of a non-compressible, non-metal, heat-resistant material such as glass fiber cloth, mineral fiber cloth, ceramic fiber cloth, aramid fiber cloth, or graphite fiber cloth, and preferably has a low coefficient of friction. The plates are mechanically fastened together by rivets, pins or the like.

European Patent No. 2136100 (Picot et al.) discloses a pad having a liner retainer formed of a metallic body and a plate. A brake liner is fixed on a face of the plate, and the retainer has a visco-elastic unit for connecting the body and the plate. The visco-elastic unit comprises a visco-elastic layer made of visco-elastic material e.g. polymer, and provided between the body and the plate. A peripheral edge of the plate is separated from an abutment of the body against a brake anchor plate by a determined space.

SUMMARY

The following summary is intended to introduce the reader to various aspects of the applicant's teaching, but not to define any invention.

According to some aspects, a brake pad includes (a) a backing plate having a backing plate first surface and a plurality of piercing members protruding from the backing plate first surface; and (b) a friction pad assembly including a friction pad and a metal sheet joined to an underside of the friction pad and positioned intermediate the friction pad and the backing plate. The metal sheet has a metal sheet first surface adjacent the friction pad, an opposed metal sheet second surface adjacent the backing plate first surface. A plurality of metal sheet protrusions protrude from the metal sheet first surface and are embedded within the friction pad. The metal sheet is impaled on the piercing members to secure the friction pad assembly to the backing plate.

In some examples, the piercing members pierce through the metal sheet. In some examples, the friction pad is impaled on the piercing members.

In some examples, the metal sheet includes a metal sheet peripheral edge extending between the metal sheet first and second surfaces. An entirety of the metal sheet first surface and the metal sheet peripheral edge may be enclosed by the friction pad.

In some examples, the metal sheet is intermediate the backing plate first surface and tips of the piercing members.

In some examples, the metal sheet has a metal sheet thickness between the metal sheet first and second surfaces, and the backing plate has a backing plate thickness between the backing plate first surface and an opposed backing plate second surface. The backing plate thickness may be at least five times greater than the metal sheet thickness.

In some examples, the piercing members have a piercing member height measured from the backing plate first surface, and the metal sheet protrusions have a protrusion height measured from the metal sheet first surface. The piercing member height may be greater than a sum of the metal sheet thickness and the protrusion height.

In some examples, the friction pad includes a friction layer and a damping layer intermediate the friction layer and the metal sheet. In some examples, the piercing members pierce through the damping layer and penetrate into the friction layer. In some examples, the metal sheet protrusions extend through the damping layer and are embedded within the friction layer.

In some examples, the friction pad assembly includes a damping layer adhesive between the damping layer and the friction layer. In some examples, the friction pad assembly includes a metal sheet adhesive between the metal sheet and the friction pad. In some examples, the brake pad includes a backing plate adhesive between the backing plate and the metal sheet.

The piercing members may be integral backing plate barbs. The metal sheet protrusions may be integral metal sheet barbs.

In some examples, the backing plate is a steel plate, and the metal sheet is an aluminum sheet.

According to some aspects, a brake pad includes (a) a backing plate having a backing plate first surface and a plurality of piercing members protruding from the backing plate first surface; and (b) a friction pad assembly including a friction pad and a metal sheet joined to the friction pad. The metal sheet is impaled on the piercing members to secure the friction pad assembly to the backing plate.

According to some aspects, a kit for manufacturing a brake pad includes (a) a backing plate having a backing plate first surface and a plurality of piercing members protruding from the backing plate first surface; and (b) a preformed friction pad assembly including a friction pad and a metal sheet joined to an underside of the friction pad. The metal sheet has a metal sheet first surface adjacent the friction pad and a plurality of metal sheet protrusions protruding from the metal sheet first surface and embedded within the friction pad. The friction pad assembly is securable to the backing plate by impaling the metal sheet on the piercing members.

In some examples, the metal sheet includes a metal sheet second surface opposite the metal sheet first surface, and a metal sheet peripheral edge extending between the metal sheet first and second surfaces. An entirety of the metal sheet first surface and the metal sheet peripheral edge may be enclosed by the friction pad.

In some examples, the metal sheet has a metal sheet thickness between the metal sheet first and second surfaces, and the backing plate has a backing plate thickness between the backing plate first surface and an opposed backing plate second surface. The backing plate thickness may be at least five times greater than the metal sheet thickness.

In some examples, the piercing members have a piercing member height measured from the backing plate first surface, and the metal sheet protrusions have a protrusion height measured from the metal sheet first surface. The piercing member height may be greater than a sum of the metal sheet thickness and the protrusion height.

In some examples, the friction pad includes a friction layer and a damping layer intermediate the friction layer and the metal sheet. The metal sheet protrusions may extend through the damping layer and may be embedded within the friction layer.

The piercing members may be integral backing plate barbs. The metal sheet protrusions may be integral metal sheet barbs.

In some examples, the backing plate is a steel plate, and the metal sheet is an aluminum sheet.

According to some aspects, a method of manufacturing a brake pad includes: (a) positioning a preformed friction pad assembly against a backing plate. The backing plate has a backing plate first surface and a plurality of piercing members protruding from the backing plate first surface. The friction pad assembly has a friction pad and a metal sheet joined to an underside of the friction pad. The friction pad assembly is positioned with the metal sheet adjacent the piercing members. The method further includes (b) impaling the metal sheet on the piercing members to secure the friction pad assembly to the backing plate.

In some examples, step (b) includes piercing through the metal sheet with the piercing members. In some examples, the method further includes (c) impaling the friction pad on the piercing members.

In some examples, the friction pad includes a friction layer and a damping layer intermediate the friction layer and the metal sheet, and step (c) includes piercing the damping layer with the piercing members. In some examples, step (c) includes impaling the friction layer on the piercing members.

In some examples, the method further includes, prior to step (a), molding uncured friction material over a metal sheet first surface of the metal sheet, and curing the friction material to form the friction pad assembly. In some examples, the metal sheet includes a plurality of metal sheet protrusions protruding from the metal sheet first surface. In some examples, the method further includes, prior to molding the uncured friction material, applying a metal sheet adhesive over the metal sheet first surface.

In some examples, the method further includes, prior to molding the uncured friction material, covering the metal sheet first surface with a damping layer. In some examples, the method further includes, prior to molding the uncured friction material, applying a damping layer adhesive over the damping layer.

In some examples, the method further includes, prior to step (b), applying a backing plate adhesive to one of the backing plate first surface and a metal sheet second surface of the metal sheet. The method may further includes pressing the metal sheet second surface against the backing plate first surface.

In some examples, step (a) includes positioning the backing plate and the friction pad assembly in a press, and step (b) includes operating the press to force the piercing members to penetrate the friction pad assembly.

According to some aspects, a multilayer metal composite includes: (a) a metal base layer having a base layer first surface textured with a plurality of integral base layer barbs; and (b) a metal substrate layer having a substrate layer first surface textured with a plurality of integral substrate layer barbs. The substrate layer is impaled on the base layer barbs to secure the substrate layer to the base layer.

In some examples, the base layer barbs pierce through the substrate layer. In some examples, the substrate layer first surface is directed away from the base layer, and the substrate layer has a substrate layer second surface opposite the substrate layer first surface and adjacent the base layer first surface. In some examples, the composite includes an adhesive between the base layer first surface and the substrate layer second surface.

In some examples, the substrate layer is intermediate the base layer first surface and tips of the base layer barbs. In some examples, the base layer barbs have a first height measured from the base layer first surface, the substrate layer barbs have a second height measured from the substrate layer first surface, and the substrate layer has a second thickness measured between the substrate layer first surface and the substrate layer second surface. The first height may be greater than a sum of the second thickness and the second height.

In some examples, the base layer is a steel plate and the substrate layer is an aluminum sheet.

According to some aspects, a method of manufacturing a multilayer metal composite includes: (a) positioning a metal substrate layer against a metal base layer. The metal base layer has a base layer first surface textured with a plurality of integral base layer barbs. The substrate layer has a substrate layer first surface textured with a plurality of integral substrate layer barbs. The method further includes (b) impaling the substrate layer on the base layer barbs to secure the substrate layer to the base layer.

In some examples, step (b) includes piercing through the substrate layer with the base layer barbs.

In some examples, the substrate layer has a substrate layer second surface opposite the substrate layer first surface, and the method may further include applying an adhesive to one of the base layer first surface and the substrate layer second surface and pressing the substrate layer second surface against the base layer first surface.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim, or dedicate to the public any such subject matter by its disclosure in this document.

Disclosed herein are multilayer metal composites that include a metal substrate layer secured to a metal base layer. The base layer can be a relatively thick plate (e.g. a backing plate of a brake pad), and the substrate layer can be a relatively thin sheet (e.g. a metal sheet having a thickness that is less than one-fifth that of the base layer). The substrate layer can be made of a material that is softer than the material of the base layer. For example, the base layer can be a steel layer and the substrate layer can be an aluminum layer. In some examples, the substrate layer can facilitate joining of the base layer to additional layers (e.g. a friction pad of a brake plate). Particularly, in some examples, the substrate layer can allow for joining of the base layer to additional layers that would otherwise not be readily joined to the base layer (e.g. due to their physical properties), or can allow for joining of the base layer to additional layers using techniques that would otherwise not be readily usable for joining the base layer to the additional layer.

For example, as will be described in further detail below with respect to the drawings, the multilayer metal composites described herein can be part of a brake pad, wherein the base layer serves as a brake pad backing plate, and the substrate layer is part of a friction pad assembly that includes a friction pad joined to the substrate layer. The substrate layer can facilitate joining of the friction pad to the backing plate. Particularly, the substrate layer can include a plurality of protrusions (e.g. hooked barbs) extending from a face thereof. During formation of the friction pad assembly, friction material can be molded onto the face of the substrate layer, and the protrusions can facilitate secure attachment of the friction material to the substrate layer. Because the substrate layer can be relatively thin, the overall weight of the friction pad assembly (including the friction pad and the substrate layer) is not necessarily significantly greater than the friction pad alone, and the energy required to cure the friction material to form the friction pad assembly is not necessarily significantly increased by including the substrate layer in the mold used for forming the friction pad.

The base layer (i.e. the backing plate) also includes a plurality protrusions extending from a face thereof. These protrusions can be generally pointed and sharp, and can also be referred to as barbs or piercing members. The friction pad assembly, including the cured friction pad and the substrate layer, can be secured to the backing plate by impaling the substrate layer of the friction pad assembly onto the piercing members of the backing plate. Because the substrate layer is softer than the base layer, the piercing members can readily pierce the substrate layer (e.g. by using a press) to impale the substrate layer on the backing plate and thereby secure the friction pad to the backing plate. Furthermore, in some examples, the piercing members can pierce through the substrate layer and penetrate into the friction material, to further enhance the bond between the friction pad assembly and the backing plate. In examples where the friction material is molded onto the protrusions of the substrate layer, the substrate layer can provide structural support to the friction material. This can facilitate piercing of the cured friction material by the piercing members without necessarily cracking or crumbling the friction material, even in cases where the friction material is considered to be generally friable.

Such examples can allow for a friction pad assembly to be pre-formed (i.e. formed separately from a backing plate), and to be subsequently secured to the backing plate by impalement. This can in turn allow for ease of manufacture, without necessarily requiring excess energy, and without significantly increasing the weight of the brake pad.

Figures 1, 2:
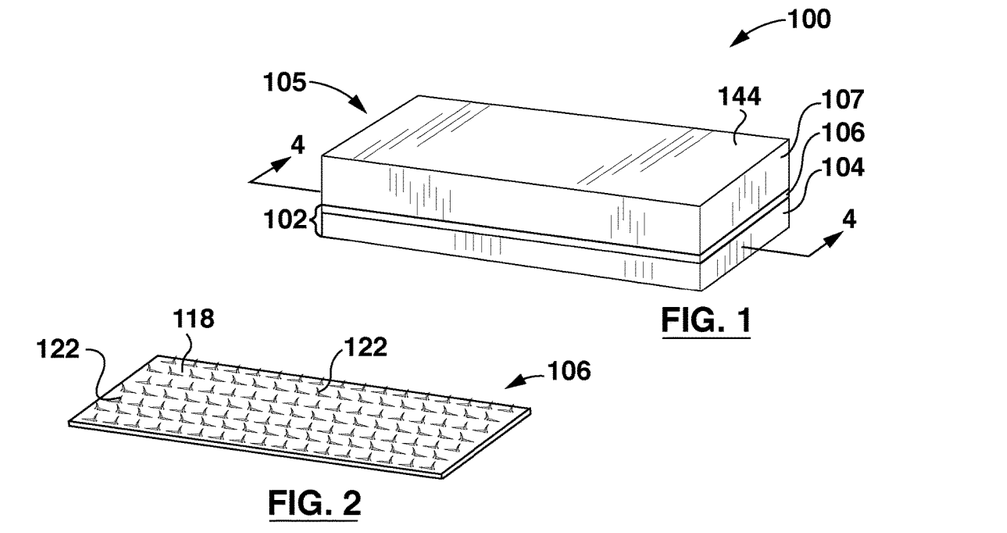
FIG. 1 is a schematic perspective view of a brake pad.
FIG. 2 is a schematic perspective view of a metal sheet of the brake pad of FIG. 1.

Referring to FIG. 1, a schematic representation of an example brake pad 100 is shown. The brake pad 100 includes a brake pad backing plate 104 (also referred to as a base layer 104) and a preformed friction pad assembly 105 secured to the backing plate 104.

Figure 3:
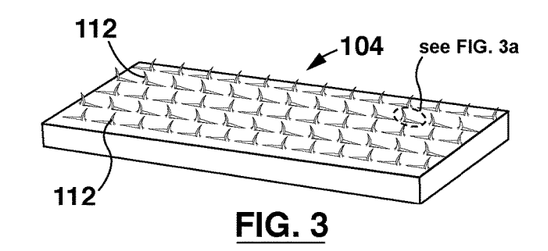
FIG. 3 is a schematic perspective view of a backing plate of the brake pad of FIG. 1.
Figure 4:
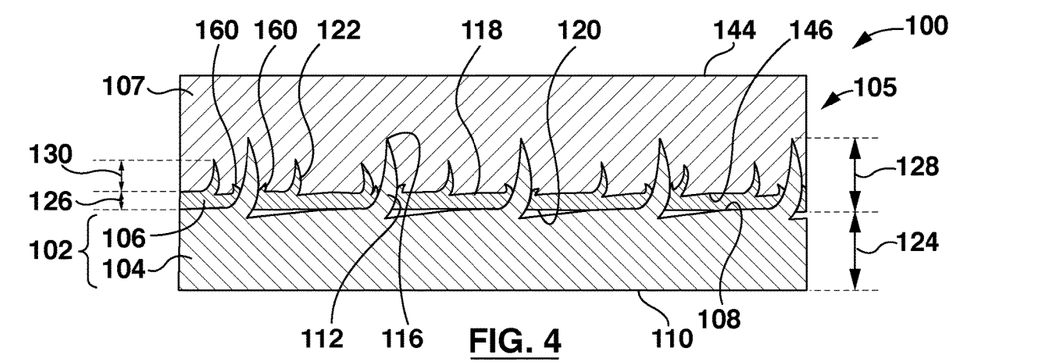
FIG. 4 is a schematic cross-sectional view of the brake pad of FIG. 1, taken along line 4-4 of FIG. 1.

Referring to FIGS. 3 and 4, the backing plate 104 has a first surface 108 (also referred to as a backing plate first surface 108 or a base layer first surface 108), an opposed second surface 110 (also referred to as a backing plate second surface 110 or a base layer second surface 108), and a plurality of piercing members 112 protruding from the first surface 108.

Referring to FIG. 4, the friction pad assembly 105 is impaled on the piercing members 112 to secure the friction pad assembly 105 to the backing plate 104. The friction pad assembly 105 includes a friction pad 107 and a metal sheet 106 (also referred to as a substrate layer 106) joined to an underside of the friction pad 107. The friction pad 107 includes a rotor facing surface 144, and an opposed underside surface 146. The metal sheet 106 is joined to the underside surface 146, and can cover all or a portion of the underside surface 146. In the example illustrated, the metal sheet 106 covers an entirety of the underside surface 146.

In the example illustrated, the metal sheet 106 also has a first surface 118 (also referred to as a metal sheet first surface 118 or a substrate layer first surface 118) adjacent the friction pad underside surface 146, an opposed second surface 120 (also referred to as a metal sheet second surface 120 or a substrate layer second surface 120), and a plurality of protrusions 122 (also referred to as metal sheet protrusions and substrate layer protrusions 122) protruding from the first surface 118. The protrusions 122 extend into the underside surface 146 of the friction pad 107, and are embedded within the friction pad 107 (this can be done, e.g. by molding the friction pad 107 to the metal sheet 106, as described below). This can help secure the friction pad 107 to the metal sheet 106, and can provide structural support to the friction material of the friction pad 107. When the friction pad assembly 105 is secured to the backing plate 104, the metal sheet 106 is intermediate the friction pad 107 and the backing plate 104. The metal sheet first surface 118 is directed away from the backing plate 104, and the metal sheet second surface 120 is adjacent the backing plate first surface 108. When secured together, the backing plate 104 and the metal sheet 106 form a multi-layer metal composite 102 of the brake pad 100.

In the example illustrated, the metal sheet 106 is impaled on the piercing members 112 of the backing plate 104 to secure the friction pad assembly 105 to the backing plate 104. In the example illustrated, the piercing members 112 of the backing plate 104 pierce through the metal sheet 106 and penetrate into the friction pad 107. Penetration into the friction pad 107 by the piercing members 112 may provide added attachment strength of the friction pad assembly to the backing plate 104. The metal sheet 106 can provide structural support to the friction material of the friction pad 107 during penetration of the friction pad 107 by the piercing members 112, and can facilitate penetration of the friction pad 107 by the piercing members 112 without necessarily significantly cracking or significantly crumbling the friction material of the friction pad 107. As the piercing members 112 pierce through the metal sheet 106, the piercing members 112 splay metal sheet material outwardly from the metal sheet first surface 118 to form splayed portions 160 (see also FIG. 9a). The splayed portions 160 can in some examples penetrate into the friction pad 107 and become embedded therein, which may further strengthen the mechanical bond between the friction pad 107 and the backing plate 104.

Figure 3A:
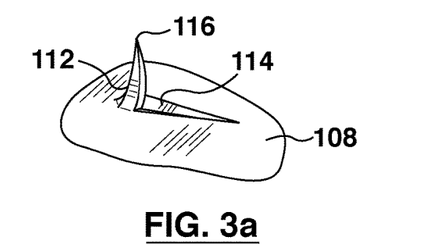
FIG. 3a is an enlarged view of a portion of the backing plate of FIG. 3.

Referring to FIGS. 3 and 3a, the piercing members 112 of the backing plate 104 are relatively straight and extend generally perpendicular to the backing plate first surface 108. Each piercing member 112 has a generally sharp, pointed tip 116 directed away from the backing plate first surface 108 for piercing into the friction pad assembly 105. In the example illustrated, the piercing members 112 are in the form of integral backing plate barbs (also referred to as base layer barbs). The backing plate barbs can be formed by texturing the backing plate first surface 108 using blades having a plurality of blade teeth. The blades can be driven across the first surface 108 to gouge the piercing members 112 from the first surface 108. For example, the blade teeth can carve grooves 114 into the backing plate 104 from which the piercing members 112 are raised. A plurality of first blades can be driven across the first surface 108 in a first direction to form a first plurality of the piercing members 112, and a plurality of second blades can be simultaneously driven across the first surface 108 in a second direction opposite the first direction to form a second plurality of the piercing members 112. In the example illustrated, the backing plate second surface 110 is generally flat and free of barbs or other similar protrusions.

Referring to FIGS. 2 and 4, in the example illustrated, the metal sheet protrusions 122 are in the form of integral barbs (also referred to as metal sheet barbs and substrate layer barbs). The metal sheet barbs can be formed by texturing the metal sheet first surface 118 in a manner similar to that described with respect to the piercing members 112. In the example illustrated, the protrusions 122 are relatively straight and extend generally perpendicular to the first surface 118. In some examples, the protrusions 122 may be generally hook-shaped and have bent or curved distal portions. In the example illustrated, the metal sheet second surface 120 is generally flat and free of barbs or other similar protrusions.

In the example illustrated, the backing plate 104 (including the piercing members 112) is formed of a different material than the metal sheet 106, and is harder than the metal sheet 106. This can facilitate piercing of the metal sheet 106 with the piercing members 112. In the example illustrated, the backing plate 104 (including the piercing members 112) is formed of steel, and the metal sheet 106 is formed of aluminum.

The friction pad 107 can include various materials, including conventional friction material. The friction pad 107 can be formed from a powder, and can include resins, such as phenolic resins, mixed with fibres of copper, brass, bronze, glass, steel, and/or aramide, and minerals such as phlogopite, muscovite, talc, vermiculite, agalmatolite, kaolin, sericite chlorite, cashew dust, and graphite. The constituents and their proportions can determine the properties of the friction pad, such as its hardness, and can be selected to permit penetration of the friction pad 107 by the piercing members 112 of the backing plate 104.

Referring to FIG. 4, in the example illustrated, the backing plate 104 and the metal sheet 106 are generally planar, and the metal sheet 106 is relatively thinner than the backing plate 104. Including a relatively thin metal sheet 106 in the friction pad assembly 105 may improve attachment characteristics of the friction pad assembly 105 without necessarily significantly increasing the weight of the friction pad assembly 105, or the energy required to form the friction pad assembly 105.

In the example illustrated, the backing plate 104 has a backing plate thickness 124 (also referred to as a first thickness 124) measured between the backing plate first surface 108 and the backing plate second surface 110. The metal sheet 106 has a metal sheet thickness 126 (also referred to as a second thickness 126) measured between the metal sheet first surface 118 and the metal sheet second surface 120. The backing plate thickness 124 is greater than the metal sheet thickness 126. In some examples, the backing plate thickness 124 is at least twice the metal sheet thickness 126. In some examples, the backing plate thickness 124 is at least five times the metal sheet thickness 126. In some examples, the metal sheet thickness 126 can be between approximately 0.4 mm and 0.6 mm, and the backing plate thickness 124 can be between approximately 5 mm and 7 mm. In some examples, the metal sheet thickness 126 is approximately 0.5 mm and the backing plate thickness 124 is approximately 6 mm.

When the friction pad assembly 105 is secured to the backing plate 104, the metal sheet 106 is intermediate the backing plate first surface 108 and the tips 116 of the piercing members 112, and the metal sheet protrusions 122 are intermediate the metal sheet first surface 118 and the tips 116 of the piercing members 112. This can provide a metal composite 102 having a plurality of protrusions (including the piercing members 112 and the protrusions 122) that can vary in height relative to the metal sheet first surface 118, which may improve retention of the friction pad 107.

In the example illustrated, the piercing members 112 have a piercing member height 128 (also referred to as a first height 128) measured from the backing plate first surface 108. The metal sheet protrusions 122 have a protrusion height 130 (also referred to as a second height 130) measured from the metal sheet first surface 118. The piercing member height 128 is greater than a sum of the metal sheet thickness 126 and the protrusion height 130. The piercing member height 128 can be between, for example, 1 mm and 3 mm, and the protrusion height 130 can be between, for example, 0.2 mm and 0.5 mm. In some examples, the piercing member height 128 can be approximately 2 mm, and the protrusion height 130 can be approximately 0.3 mm.

Figure 5A:
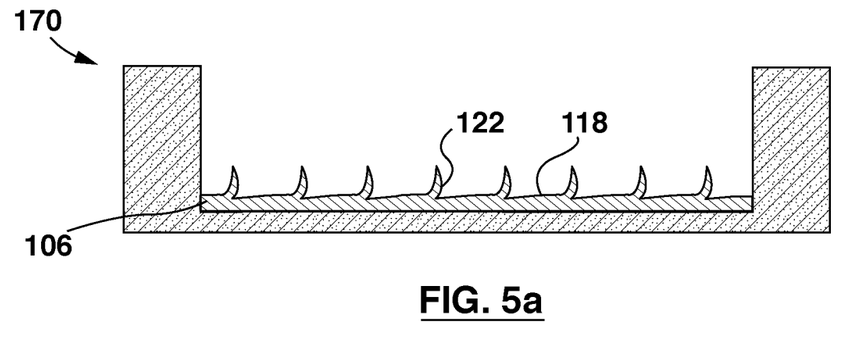
FIG. 5a is a schematic representation of a step of an example method for forming a friction pad assembly of the brake pad of FIG. 1.
Figure 5B:
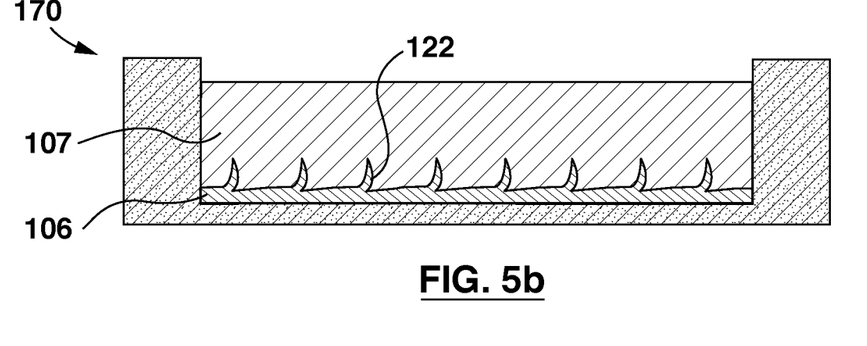
FIG. 5b is a schematic representation of a step subsequent to that of FIG. 5a of the method for forming the friction pad assembly of the brake pad of FIG. 1.

Referring to FIG. 5a, to form the friction pad assembly 105, the metal sheet 106 can be positioned in a mold 170 with the metal sheet first surface 118 facing upwards. Referring to FIG. 5b, uncured friction material for forming the friction pad 107 can be molded over the metal sheet 106. The friction material can then be cured to form the friction pad assembly 105.

Optionally, adhesives (e.g. chemical bonding agents) may be provided between the metal sheet 106 and the friction pad 107 to help strengthen the bond therebetween. For example, a metal sheet adhesive can be applied over the metal sheet first surface 118 prior to molding the uncured friction material over the metal sheet 106.

Figure 5C:
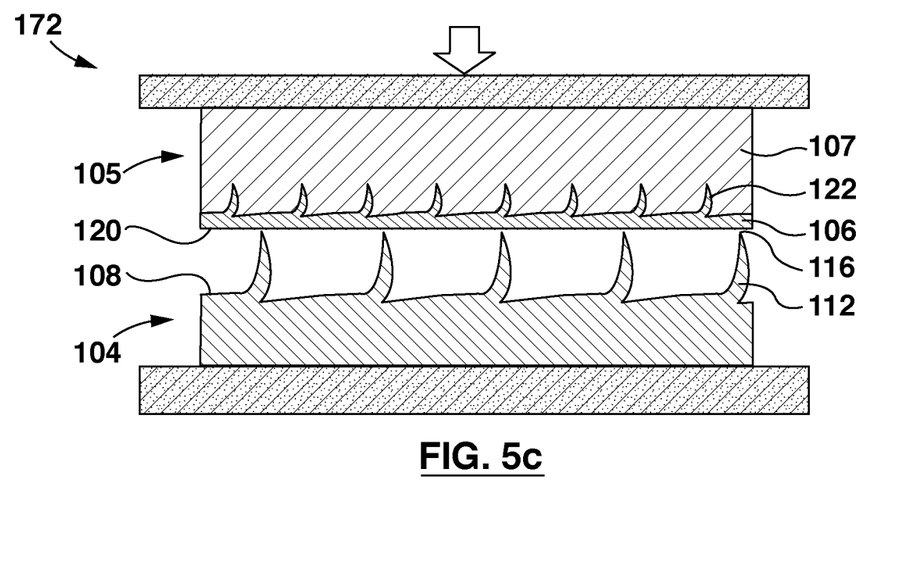
FIG. 5c is a schematic representation of a step for assembling the brake pad of FIG. 1.

Referring to FIG. 5c, to assemble the brake pad 100, the formed friction pad assembly 105 and the backing plate 104 can be positioned in a fixture of a press 172. The friction pad assembly 105 can be aligned with and positioned against the backing plate 104, with the metal sheet 106 adjacent the tips 116 of the piercing members 112. The press 172 can be engaged to press the friction pad assembly 105 against the piercing members 112 so that the metal sheet 106 and the friction pad 107 are impaled onto the piercing members 112. The press 172 can force the piercing members 112 to penetrate into the friction pad assembly 105, such that the piercing members 112 pierce through the metal sheet 106 and penetrate into the friction pad 107 (as shown in FIG. 4). When the metal sheet second surface 120 is adjacent the backing plate first surface 108, the press 172 can be released. A sealant may then optionally be applied around a periphery of the friction pad assembly 105 to seal the interface between the friction pad assembly 105 and the backing plate first surface 108.

Optionally, prior to positioning the friction pad assembly 105 against the backing plate 104, an adhesive can be provided between the friction pad assembly 105 and the backing plate 104. For example, a backing plate adhesive can be applied over the backing plate first surface 108, and/or the metal sheet second surface 120, and the metal sheet second surface 120 can be pressed against the backing plate first surface 108 for added attachment strength of the friction pad assembly 105 to the backing plate 104.

Figure 6:
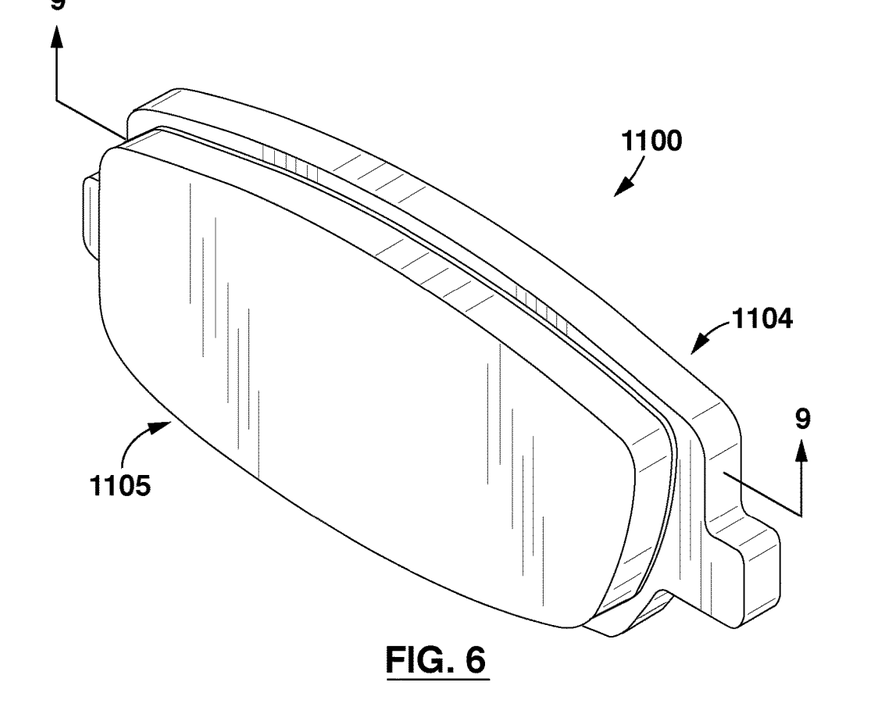
FIG. 6 is a front perspective view of an alternative brake pad.

Referring now to FIG. 6, an alternative brake pad 1100 is shown. The brake pad 1100 has similarities to the brake pad 100, and like features are identified by like reference characters, incremented by 1000. The brake pad 100 includes a brake pad backing plate 1104, and a preformed friction pad assembly 1105 secured to the backing plate 1104.

Figure 7:
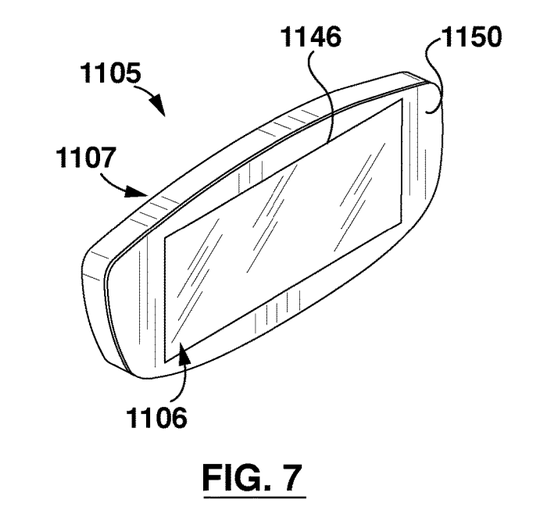
FIG. 7 is rear perspective view of a friction pad assembly of the brake pad of FIG. 6.
Figure 8:
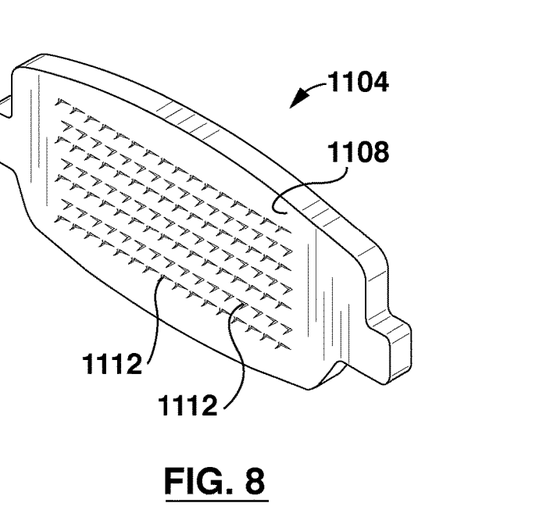
FIG. 8 is a front perspective view of a backing plate of the brake pad of FIG. 6.

Referring to FIG. 7, in the example illustrated, the friction pad assembly 1105 includes a friction pad 1107, and a metal sheet 1106 joined to an underside surface 1146 of the friction pad 1107. Referring to FIG. 8, the backing plate 1104 includes a backing plate first surface 1108 and a plurality of piercing members 1112 protruding from the backing plate first surface 1108.

Figure 9:
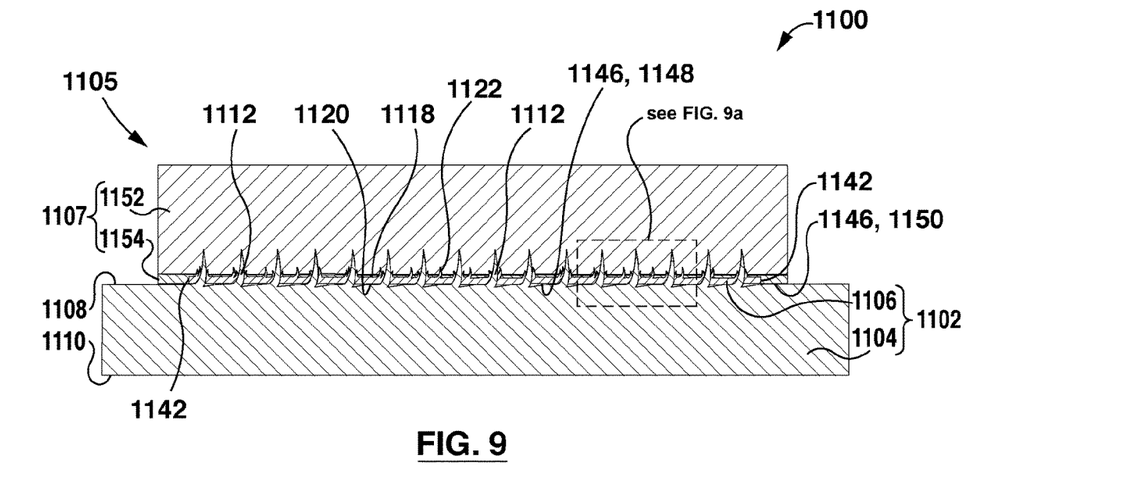
FIG. 9 is a schematic cross-sectional view of the brake pad of FIG. 6, taken along line 9-9 of FIG. 6.

Referring to FIG. 9, the metal sheet 1106 is impaled on the piercing members 1112 of the backing plate 1104 to secure the friction pad assembly 1105 to the backing plate 1104. When secured together, the backing plate 1104 and the metal sheet 1106 form a multi-layer metal composite 1102 of the brake pad 1100.

In the example illustrated, the metal sheet 1106 has a metal sheet first surface 1118 adjacent the underside surface 1146 of the friction pad 1107, an opposed metal sheet second surface 1120, a metal sheet peripheral edge 1142 extending between the metal sheet first and second surfaces 1118, 1120, and a plurality of metal sheet protrusions 1122 protruding from a metal sheet first surface 1118. The protrusions 1122 extend into the underside surface 1146 of the friction pad 1107, and are embedded within the friction pad 1107.

Referring to FIGS. 7 and 9, in the example illustrated, the metal sheet 1106 covers only a portion of the underside surface 1146 of the friction pad. In some examples, the metal sheet 1106 can cover between 50 and 90 percent of the underside surface 1146 of the friction pad 1107. In some examples, the metal sheet 1106 can cover between 60 and 80 percent of the underside surface 1146. In the example illustrated, the underside surface 1146 of the friction pad 1107 has an underside surface central portion 1148, and an underside surface peripheral portion 1150 extending about a periphery of the underside surface central portion 1148. In the example illustrated, the metal sheet 1106 covers an entirety of the underside surface central portion 1148.

Referring to FIG. 9, in the example illustrated, the underside surface central portion 1148 is recessed relative to the underside surface peripheral portion 1150. When the friction pad assembly 1105 is secured to the backing plate 1104, the underside surface peripheral portion 1150 is adjacent a peripheral portion of the backing plate first surface 1108, and the metal sheet 1106 is intermediate the underside surface central portion 1148 and a central portion of the backing plate first surface 1108. In the example illustrated, an entirety of the metal sheet first surface 1118 and the metal sheet peripheral edge 1142 is enclosed by the friction pad 1107.

In the example illustrated, the friction pad 1107 is a multi-layer friction pad. The friction pad 1107 includes a friction layer 1152 of friction material, and a damping layer 1154 for damping vibration and noise. The damping layer 1154 can be, for example, a layer of rubber material. In the example illustrated, the damping layer 1154 is intermediate the friction layer 1152 and the metal sheet 1106, and defines an entirety of the underside surface 1146 of the friction pad 1107.

Figure 9A:
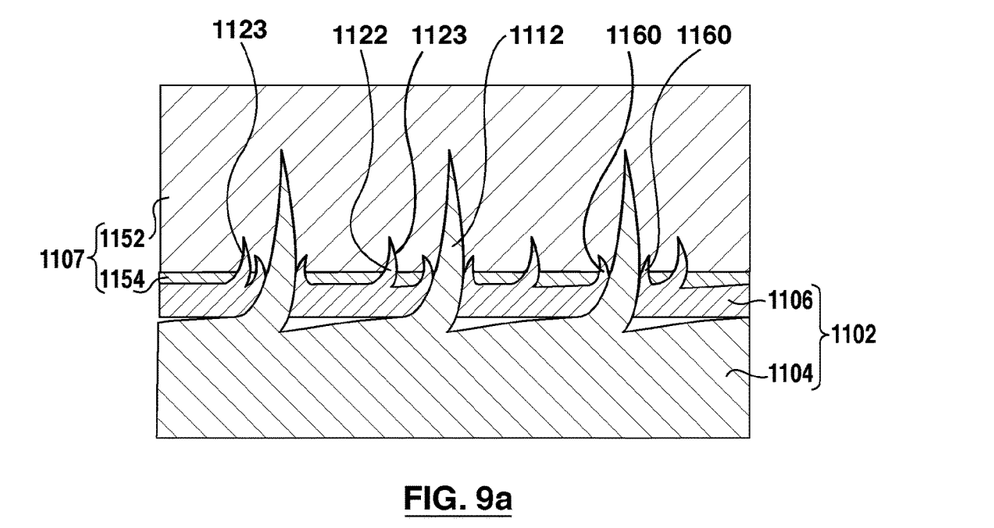
FIG. 9a is an enlarged view of a portion of FIG. 9.

Referring to FIG. 9a, in the example illustrated, the metal sheet protrusions 1122 extend through the damping layer 1154, and distal portions 1123 of the protrusions 1122 are embedded within the friction layer 1152. In the example illustrated, the piercing members 1112 of the backing plate 1104 pierce through the metal sheet 1106 and the damping layer 1154, and penetrate into the friction layer 1152. As the piercing members 1112 pierce through the metal sheet 1106, the piercing members 1112 may splay metal sheet material outwardly from the metal sheet first surface 1118 to form splayed portions 1160. The splayed portions 1160 may in some cases penetrate into the friction pad 1107 and become embedded therein, which may further strengthen the mechanical bond between the friction pad 1107 and the backing plate 1104.

Figure 10A:
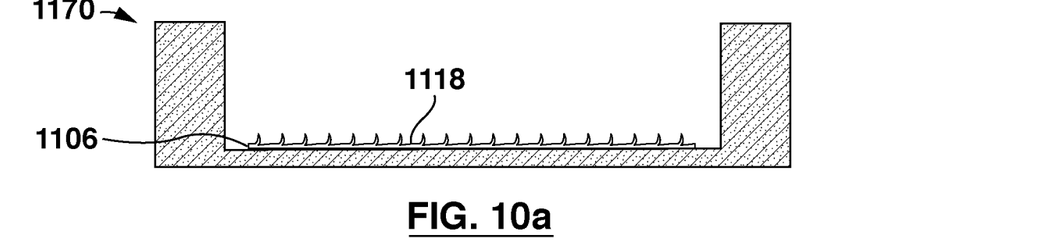
FIG. 10a is a schematic representation of a step of an example method for forming the friction pad assembly of FIG. 7.
Figure 10B:
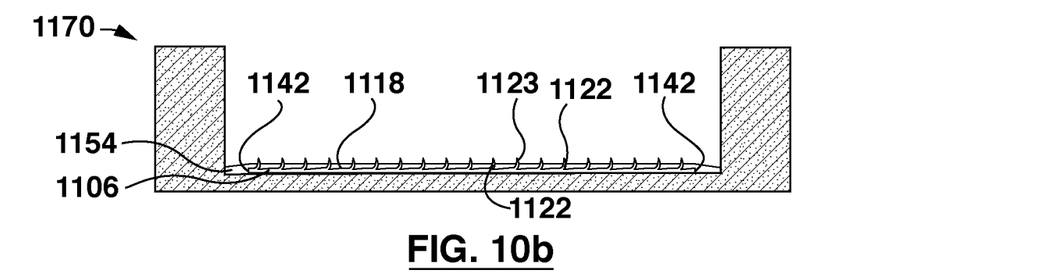
FIG. 10b is a schematic representation of a step subsequent to that of FIG. 10a of the method for forming the friction pad assembly of FIG. 7.
Figure 10C:
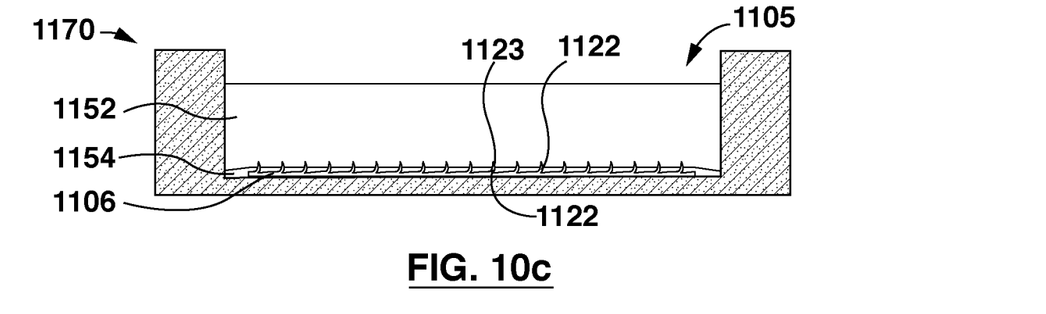
FIG. 10c is a schematic representation of a step subsequent to that of FIG. 10b of the method for forming the friction pad assembly of FIG. 7.

Referring to FIG. 10*a*, to form the friction pad assembly 1105, the metal sheet 1106 can be positioned in a mold 1170 with the metal sheet first surface 1118 facing upwards. Referring to FIG. 10*b*, the metal sheet first surface 1118 can be covered with the damping layer 1154. The damping layer 1154 can enclose the metal sheet first surface 1118 and the metal sheet peripheral edge 1142. The distal portions 1123 of the protrusions 1122 can optionally be left uncovered for embedding into the friction layer 1152. Referring to FIG. 10*c*, uncured friction material for forming the friction layer 1152 can then be molded over the damping layer 1154 and the metal sheet 1106, and may enclose the distal portions 1123 of the protrusions 1122. The friction pad 1107 can then be cured to form the friction pad assembly 1105.

Optionally, adhesives may be provided between respective layers of the friction pad assembly 1105 to help strengthen the bond therebetween. For example, prior to covering the metal sheet with the damping layer 1154, a metal sheet adhesive can be applied over the metal sheet first surface 1118 to help strengthen the bond between the metal sheet 1106 and the friction pad 1107. Prior to molding the friction material over the damping layer 1154 and the metal sheet 1106, a damping layer adhesive can be applied over the damping layer 1154 to help strengthen the bond between the damping layer 1154 and the friction layer 1152.

Figure 10D:
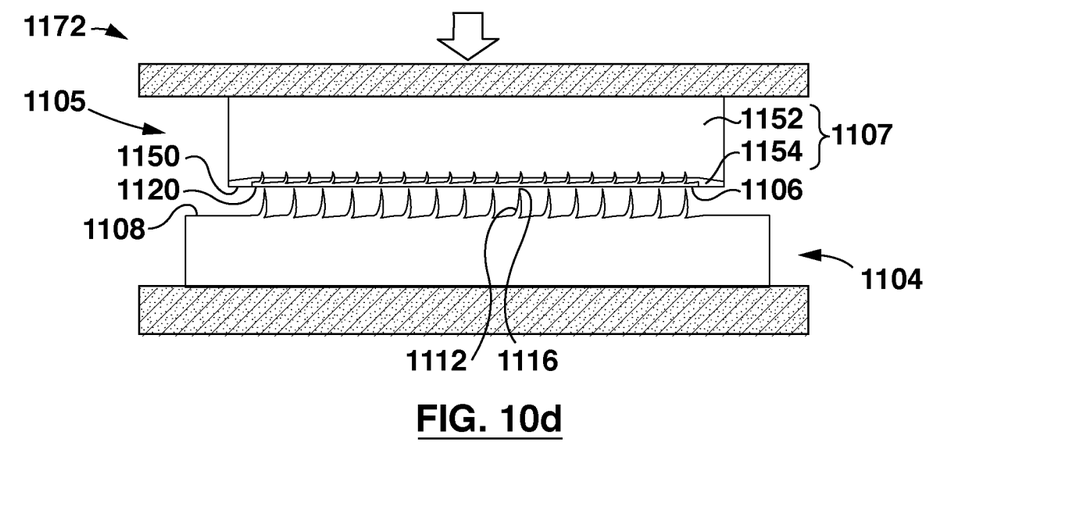
FIG. 10d is a schematic representation of a step of an example method for assembling the brake pad of FIG. 6.

Referring to FIG. 10*d*, to assemble the brake pad 1100, the formed friction pad assembly 1105 and the backing plate 1104 can be positioned in a fixture of a press 1172. The friction pad assembly 1105 can be aligned with and positioned against the backing plate 1104, with the metal sheet 1106 adjacent tips 1116 of the piercing members 1112. The press 1172 can be engaged to press the friction pad assembly 1105 against the piercing members 1112 so that the metal sheet 1106 and the friction pad 1107 are impaled onto the piercing members 1112. The press 1172 can force the piercing members 1112 to penetrate into the friction pad assembly 1105, such that the piercing members 1112 pierce through the metal sheet 1106 and the damping layer 1154, and penetrate into the friction layer 1152. When the metal sheet second surface 1120 is adjacent the backing plate first surface 1108, the press 1172 can be released. A sealant may then be applied around a periphery of the friction pad assembly 1105 to seal the interface between the friction pad assembly 1105 and the backing plate first surface 1108.

Optionally, prior to positioning the friction pad assembly 1105 against the backing plate 1104, a backing plate adhesive can be applied over the backing plate first surface 1108, and/or the metal sheet second surface 1120 and the underside surface peripheral portion 1150 of the friction pad 1107 for added attachment strength of the friction pad assembly 1105 to the backing plate 1104.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

I claim:

1. A brake pad comprising:
    a) a backing plate having a backing plate first surface and a plurality of piercing members protruding from the backing plate first surface; and
    b) a friction pad assembly including a friction pad and a metal sheet joined to an underside of the friction pad and positioned intermediate the friction pad and the backing plate, the metal sheet having a metal sheet first surface adjacent the friction pad, an opposed metal sheet second surface adjacent the backing plate first surface, and a plurality of metal sheet protrusions protruding from the metal sheet first surface and embedded within the friction pad, the metal sheet impaled on the piercing members to secure the friction pad assembly to the backing plate;
    wherein the metal sheet has a metal sheet thickness between the metal sheet first and second surfaces, and the backing plate has a backing plate thickness between the backing plate first surface and an opposed backing plate second surface, and wherein the backing plate thickness is at least five times greater than the metal sheet thickness; and
    wherein the piercing members have a piercing member height measured from the backing plate first surface, and the metal sheet protrusions have a protrusion height measured from the metal sheet first surface, and wherein the piercing member height is greater than a sum of the metal sheet thickness and the protrusion height.

2. The brake pad of claim 1, wherein the piercing members pierce through the metal sheet and the friction pad is impaled on the piercing members.

3. The brake pad of claim 1, wherein the metal sheet includes a metal sheet peripheral edge extending between the metal sheet first and second surfaces, and wherein an entirety of the metal sheet first surface and the metal sheet peripheral edge is enclosed by the friction pad.

4. The brake pad of claim 1, further comprising a backing plate adhesive between the backing plate and the metal sheet.

5. The brake pad of claim 1, wherein the piercing members comprise integral backing plate barbs, and/or wherein the metal sheet protrusions comprise integral metal sheet barbs.

6. The brake pad of claim 1, wherein the backing plate comprises a steel plate, and the metal sheet comprises an aluminum sheet.

7. A kit for manufacturing a brake pad, the kit comprising:
    a) a backing plate having a backing plate first surface and a plurality of piercing members protruding from the backing plate first surface; and
    b) a friction pad assembly comprising a friction pad and a metal sheet joined to an underside of the friction pad, the metal sheet having a metal sheet first surface adjacent the friction pad and a plurality of metal sheet protrusions protruding from the metal sheet first surface and embedded within the friction pad, the friction pad assembly securable to the backing plate by impaling the metal sheet on the piercing members;

wherein the metal sheet has a metal sheet thickness between the metal sheet first and second surfaces, and the backing plate has a backing plate thickness between the backing plate first surface and an opposed backing plate second surface, and wherein the backing plate thickness is at least five times greater than the metal sheet thickness; and wherein the piercing members have a piercing member height measured from the backing plate first surface, and the metal sheet protrusions have a protrusion height measured from the metal sheet first surface, and wherein the piercing member height is greater than a sum of the metal sheet thickness and the protrusion height.

8. The kit of claim 7, wherein the metal sheet includes a metal sheet second surface opposite the metal sheet first surface, and a metal sheet peripheral edge extending between the metal sheet first and second surfaces, and wherein an entirety of the metal sheet first surface and the metal sheet peripheral edge is enclosed by the friction pad.

9. The kit of claim 7, wherein the piercing members comprise integral backing plate barbs and/or wherein the metal sheet protrusions comprise integral metal sheet barbs.

10. The kit of claim 7, wherein the backing plate comprises a steel plate, and the metal sheet comprises an aluminum sheet.

11. A method of manufacturing a brake pad, the method comprising:
    a) positioning a preformed friction pad assembly against a backing plate, the backing plate having a backing plate first surface and a plurality of piercing members protruding from the backing plate first surface, and the friction pad assembly having a friction pad and a metal sheet joined to an underside of the friction pad, the friction pad assembly positioned with the metal sheet adjacent the piercing members;
    b) impaling the metal sheet on the piercing members to secure the friction pad assembly to the backing plate, wherein step b) comprises piercing through the metal sheet with the piercing members; and
    c) impaling the friction pad on the piercing members.

12. The method of claim 11, further comprising, prior to step (a), molding uncured friction material over a metal sheet first surface of the metal sheet, and curing the friction material to form the friction pad assembly.

13. The method of claim 12, further comprising, prior to molding the uncured friction material, applying a metal sheet adhesive over the metal sheet first surface.

14. The method of claim 11, further comprising, prior to step (b), applying a backing plate adhesive to one of the backing plate first surface and a metal sheet second surface of the metal sheet, and wherein the method further comprises pressing the metal sheet second surface against the backing plate first surface.

15. The method of claim 11, wherein step (a) comprises positioning the backing plate and the friction pad assembly in a press, and wherein step (b) comprises operating the press to force the piercing members to penetrate into the friction pad assembly.

16. A method of manufacturing a brake pad, the method comprising:
    a) positioning a preformed friction pad assembly against a backing plate, the backing plate having a backing plate first surface and a plurality of piercing members protruding from the backing plate first surface, and the friction pad assembly having a friction pad and a metal sheet joined to an underside of the friction pad, the friction pad assembly positioned with the metal sheet adjacent the piercing members; and
    b) impaling the metal sheet on the piercing members to secure the friction pad assembly to the backing plate;

wherein the method further comprises, prior to step (a), molding uncured friction material over a metal sheet first surface of the metal sheet, and curing the friction material to form the friction pad assembly; and wherein the metal sheet includes a plurality of metal sheet protrusions protruding from the metal sheet first surface.

17. A multilayer metal composite comprising:
    a) a metal base layer having a base layer first surface textured with a plurality of integral base layer barbs; and
    b) a metal substrate layer having a substrate layer first surface textured with a plurality of integral substrate layer barbs, the substrate layer impaled on the base layer barbs to secure the substrate layer to the base layer;

wherein the base layer barbs have a first height measured from the base layer first surface, the substrate layer barbs have a second height measured from the substrate layer first surface, and the substrate layer has a second thickness measured between the substrate layer first surface and the substrate layer second surface, and wherein the first height is greater than a sum of the second thickness and the second height.

18. The composite of claim 17, wherein the base layer barbs pierce through the substrate layer.

19. The composite of claim 17, wherein the substrate layer first surface is directed away from the base layer, and the substrate layer has a substrate layer second surface opposite the substrate layer first surface and adjacent the base layer first surface, and wherein the composite further comprises an adhesive between the base layer first surface and the substrate layer second surface.

20. The composite of claim 17, wherein the substrate layer is intermediate the base layer first surface and tips of the base layer barbs.

* * * * *